United States Patent [19]
Olson et al.

[11] Patent Number: 5,987,376
[45] Date of Patent: Nov. 16, 1999

[54] SYSTEM AND METHOD FOR THE DISTRIBUTION AND SYNCHRONIZATION OF DATA AND STATE INFORMATION BETWEEN CLIENTS IN A DISTRIBUTED PROCESSING SYSTEM

[75] Inventors: Kipley J. Olson, Seattle, Wash.; Andrew R. Cohen, Steamboat Springs, Colo.

[73] Assignee: Microsoft Corporation, Redmond, Wash.

[21] Appl. No.: 08/893,960

[22] Filed: Jul. 16, 1997

[51] Int. Cl.$^6$ .................................................. G06F 15/16
[52] U.S. Cl. ........................... 701/201; 709/205; 709/248
[58] Field of Search .......................... 395/200.31, 200.35, 395/200.78; 709/201, 205, 248

[56] References Cited

U.S. PATENT DOCUMENTS

| | | | |
|---|---|---|---|
| 5,245,553 | 9/1993 | Tanenbaum | 364/514 |
| 5,392,400 | 2/1995 | Berkowitz et al. | 395/200.3 |
| 5,764,904 | 6/1998 | Kurashima | 395/200.38 |
| 5,781,732 | 7/1998 | Adams | 395/200.35 |
| 5,805,886 | 9/1998 | Skarbo et al. | 395/685 |
| 5,822,525 | 10/1998 | Tafoya et al. | 395/200.34 |
| 5,828,838 | 10/1998 | Downs et al. | 395/200.34 |

*Primary Examiner*—Zarni Maung
*Assistant Examiner*—Saleh Najjar
*Attorney, Agent, or Firm*—Workman, Nydegger, Seeley

[57] ABSTRACT

The present invention is directed to a novel system and method for sharing common data and state information between network connected application clients participating in an application session. The application session is invoked by a host client. The host client is responsible for selectively admitting other network connected clients into the application session, and is also the application client that is responsible for distributing a common set of application data for storage at each admitted application client. The application data includes a unique identifier, assigned by the host client, for each application client in the application session. In the event that an application client effects a change to the application data, that change is communicated to each of the other application clients in the session. In this way, each client is always operating on a common set of application data. When a new client is admitted into an application session, application data is forwarded to it in a manner so that the new client receives data that is synchronized with the data possessed by every other application client in the session. A method for migrating host client duties to another application client is also disclosed.

17 Claims, 8 Drawing Sheets

SYSTEM AND METHOD FOR THE DISTRIBUTION AND SYNCHRONIZATION OF DATA AND STATE INFORMATION BETWEEN CLIENTS IN A DISTRIBUTED PROCESSING SYSTEM

BACKGROUND OF THE INVENTION

1. The Field of the Invention

The present invention relates to distributed processing systems. More particularly, the present invention is directed to a system and method for distributing and synchronizing data between application clients in a distributed processing environment.

2. The Prior State of the Art

As is well known, computers and related technology affect every aspect of today's society. Indeed, the computer's ability to gather, process and distribute information has transformed the way we live and work. As technology has continued to enhance this ability to gather, process and distribute information, the need for interconnection of computers has resulted, giving rise to the proliferation of computer networks. Initially, this networking of computers—both by way of local area networks (LAN) and wide area networks (WAN)—was done primarily in business and commercial environments. However, with the advent of commercial service providers such as Microsoft® Network and America Online®, the interconnection and communication between physically disparate computers is also available for home and personal use.

Computer networks were initially designed and implemented for purposes of facilitating the exchange of data and information between computer users, i.e., exchanging data files, sending and receiving of electronic mail, etc. However, the increased availability of high speed networks has given rise to the need for more sophisticated distributed network applications. Such applications must allow for the transparent interoperation and communication between applications that run on respective client computers connected via the particular network.

While such distributed applications can serve any one of a number of different functions, one timely example is computer game applications. With this type of distributed application, users execute a computer game application on a network connected client computer (referred to as a client), and the users/players then interoperate via the network (LAN or WAN) so as to allow each user/player to compete against one another. Obviously, this sort of distributed application environment requires that each computer client be able to continuously access and manipulate a shared set of application data, and it must do so in a manner so that any data and state changes are simultaneously communicated to each client. For instance, in a multi-participant game environment, when one application client/player effects a change to the game state, e.g., movement of players, player characteristics, player actions, animation changes, entry and/or exit of players to the game, game scores, etc., the underlying application data must be changed accordingly and that change must be instantly available and shared with each of the other clients/players participating in the game. Further, the nature of a computer game environment is such that players must be able to enter and exit the game arbitrarily and at any time. Obviously, new players must be admitted so that they are provided with the current state of the game, and be synchronized with the existing players.

The implementation of distributed network applications of this sort present special challenges that relate to this need for sharing and distribution of data, and the need to dynamically allow players to enter/exit the game. In the past, techniques for this sharing, distribution and synchronization of data amongst multiple clients have not been entirely satisfactory. Typically, the management of shared data in a distributed environment is accomplished in one of two ways: with a client/server setup or with peer-to-peer messaging. Both approaches have drawbacks. In a client/server environment the data is physically stored at one dedicated network server, and then made available for access to each of the network connected clients. Because it resides at one location, the data is easily managed, kept up-to-date, and is uniformly available to all of the network clients. However, the server must always be present in the network—impractical for many of today's network applications which allow for the continuous entry and exit of client participants, such as multi-participant computer games.

In contrast, with a strictly peer-to-peer communications approach the shared data is physically stored at every network client. Changes to the data by any one client must be propagated to all other clients on the network. While this is advantageous in that there is no requirement for an always-present server or central repository of data, the timing and synchronization of data changes is difficult, which can result in the shared data being different from one client to the other. The problem can be exasperated in slower networks, such as a WAN, where data changes may not be communicated to the other clients in a timely manner. Further, the distributed nature of the peer-to-peer approach does not provide for a satisfactory environment in which clients can exit the application, and in which outside clients can enter the application as new participants, and at the same time maintain the integrity of the application data. Also, in a peer-to-peer environment, there is typically no one single client that has control over the application session to regulate the entry and exit of clients, or to otherwise monitor or control any aspects of the application session.

As the availability of computer networks grows, the need for the interoperation between distributed network applications will continue to expand. Accordingly, what is needed in the art is a system and method that permits for the efficient and reliable sharing of application data, and at the same time that permits for ad hoc entry and exit of application clients.

BRIEF SUMMARY AND PRINCIPAL OBJECTS OF THE INVENTION

The foregoing problems in the prior state of the art have been successfully overcome by the present invention, which is directed to a system and method for distributing and synchronizing data and state information between network connected clients running a distributed network application. The present invention addresses the above deficiencies by utilizing and combining variations of both the client/server and peer-to-peer messaging approaches typically used to manage shared application data. With the present invention, any change made to shared application data by one client is simultaneously communicated to each of the other clients participating in the network application. Further, the invention allows participating clients to exit the application, and new clients to be admitted, in a manner that does not adversely affect the accuracy or synchronization of the underlying shared application data.

In one preferred embodiment of the invention, an "application session" is invoked by a host client. The host client admits new network connected clients (i.e., a computer executing the particular application) into the application session, and is also responsible for insuring that a shared set of application data is properly distributed amongst each of the application clients. As used herein, the term "network" is intended to encompass local area networks, wide area networks, point-to-point networks, public internets, commercial service networks, etc., and is not intended to be limited to any specific network protocol or architecture.

In a preferred embodiment, the application data set used by each of the clients includes a table containing unique identifiers for each of the application clients participating in the application session, and state data that is relevant to the particular application being executed across the network, such as a multi-participant computer game. The application data set is forwarded by the host client so as to be stored at each application client. Thereafter, when an application client alters its own application data, as for instance would occur when a particular game parameter is altered by that client, the change is communicated to the other clients in the session by way of a state update packet. Each client receives the state update packet and changes its own application data in accordance with the contents of the packet. In this way, even though changes to the data are being made throughout the network, each client is always operating on the same set of data. For instance, if the distributed application were a computer game, when one client/player makes a change to the game state (i.e., player movement, etc.), each of the other client/players are apprised of that change.

Preferably, the host client also functions to ensure that new application clients are admitted to the session in an orderly fashion, and that they are provided with up-to-date application data in a manner so as to be synchronized with the application data stored at other existing application clients. To do so, the host continuously entertains admission requests from new network connected clients. If predefined admission criteria are satisfied, the host will grant entry by first assigning a unique identifier to the requesting client. The host then forwards that unique identifier to each of the then existing application clients, and then begins downloading existing application data to the new client. During the time interval that this data is being transferred, any changes that occur to the application data (e.g., that would occur when another client/player makes a game move, or otherwise affects the game state) are forwarded to the newly admitted client by way of update packets. The contents of those update packets are then stored by the new client in a data storage area referred to as the "pending queue." Once the host completes transfer of the application data, the new client immediately updates the application data in accordance with the contents of the pending queue data. The new client's application data is then synchronized with that of each of the other application clients, and it can begin participating in the application session.

In a preferred embodiment, the current invention also ensures that host responsibilities can be migrated to a new application client in the event that the existing host exits the application session. When the host exits, each application client searches the unique client identifiers contained within its name table. The client having an identifier that satisfies a predetermined selection criteria will then become new host client. In this way, host duties can be easily transferred to other clients within the application session, without the need for any complex arbitration or negotiation to take place amongst clients.

Accordingly, it is a primary object of the present invention to provide a system and method for implementing an efficient, network based, distributed processing environment that is capable of hosting an application session in which multiple application clients participate.

Another important object of the present invention is to provide a distributed processing environment that is capable of ensuring that a shared set of application data is available to each of the application clients participating in the application session.

An additional object of the present invention is to provide a system and method that, in the event that application data is altered by any application client in the distributed processing environment, facilitates the timely distribution of that change to each of the other participating application clients so as to insure that each is operating on the same data.

Another object of the present invention is to provide a system and method that operates in a distributed processing application session so that changes to application data are synchronized in a manner so as to ensure that each participating client always has a complete and up-to-date state.

Yet another important object of the present invention is to provide a system and method that provides a distributed processing application session that utilizes a single host client for controlling the distribution of application data among application clients participating in the session, and that regulates the entry and admission of new clients into the application session.

Still another object of the present invention is to provide a system and method that results in a distributed processing application session that permits new clients to enter the application session in a manner so as to be provided with current application data.

Another object of the present invention is to provide a system and method that provides for the orderly migration of host duties from an existing host to a new application client.

These and other objects, features and advantages of the present invention will be set forth in the description which follows, and in part will be more apparent from the detailed description of a preferred embodiment, and/or from the appended claims, or may be learned by actual practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following invention is described by using functional flow diagrams and program flow charts to illustrate either the structure or processing of embodiments used to implement the system and method of the present invention. Using the diagrams in this manner to present the invention should not be construed as limiting of its scope. The present invention contemplates both methods and systems for distributing and synchronizing data and state information between application clients in a network based distributed processing system. Embodiments of the present invention may comprise a special purpose or general purpose client computer comprising standard computer hardware such as a central processing unit (CPU) or other processing means for executing computer executable instructions, computer readable media for storing executable instructions, a display or other output means for displaying or outputting information, a keyboard or other input means for inputting information, and so forth.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

A preferred embodiment of the present invention comprises a computer programmed method that executes in a system of client computers that are interconnected by way of a computer network. This resulting program method and processing system provide an architecture under which program data and state information can be synchronized and distributed between distributed computer applications executing at each of the network clients. It is anticipated that the program method would preferably be implemented so as to provide an application program interface (API) that is capable of transparently providing any given application this ability to share data with other application clients in the application session. Thus, when the application is executed at a particular client, the program API is invoked and provides the appropriate interface between the application and the network, thereby establishing the client-to-client application session. It will be appreciated that while any one of a number of computer applications could take advantage of this synchronized exchange of application data between network connected clients, the instant invention will be described in the context of a specific type of computer application—computer games.

Figure 1:
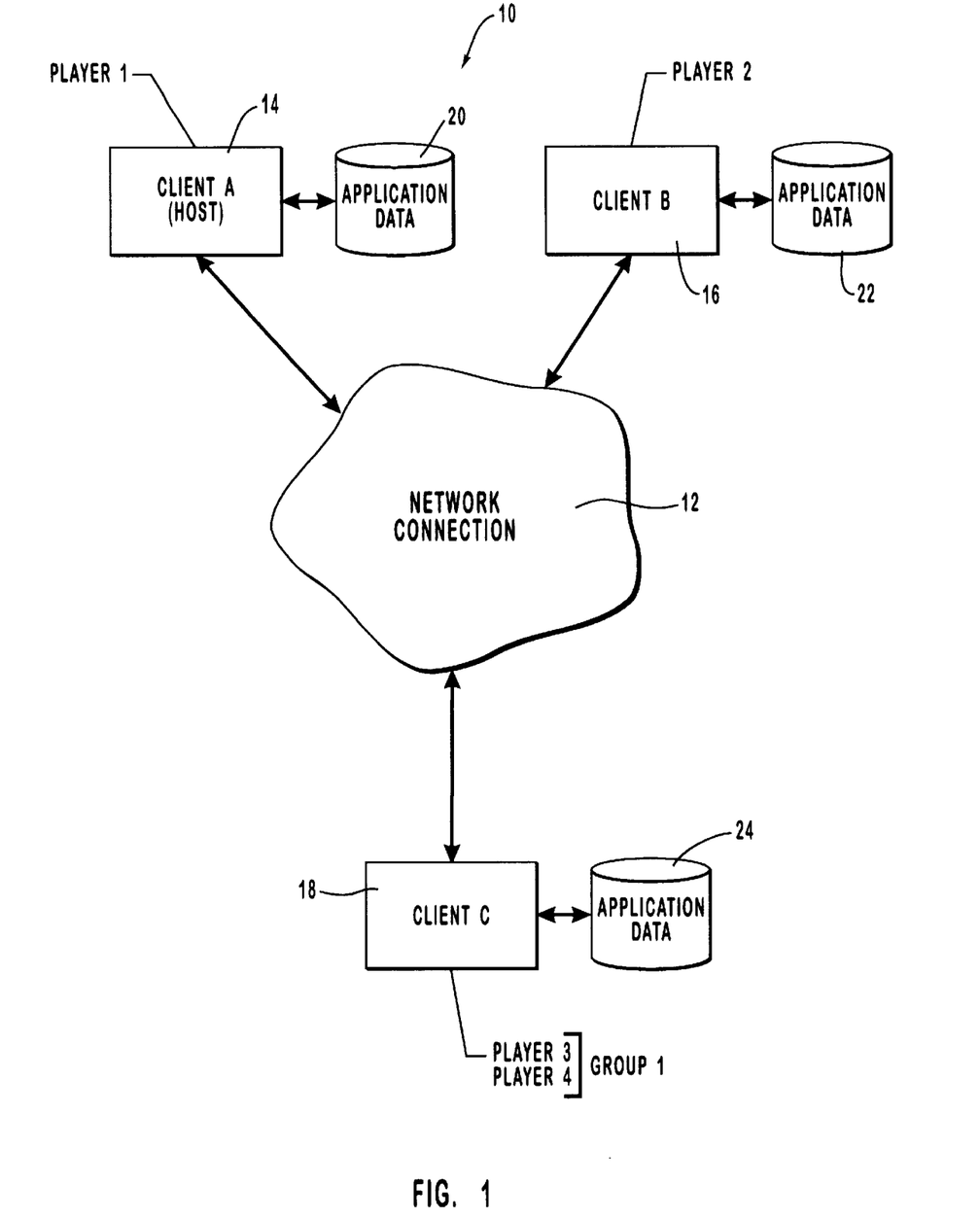
FIG. 1 is a diagram illustrating one example of a generalized distributed processing system of the present invention having network connected clients that are each participating in an application session.

Turning now to FIG. 1, an example of a network based distributed processing system implemented in accordance with the system and method of the current invention is shown generally at 10. For purposes of illustration, the system is shown as including an arbitrary network 12. The specific network implementation used can be comprised of, for example, any type of local area network (LAN) and associated LAN topologies and protocols; simple point-to-point networks (such as direct modem-to-modem connection); and wide area network (WAN) implementations, including public internets and commercial based network services such as Microsoft® Network.

Connected to the network 12 are a plurality of clients, designated in this example as client A 14, client B 16, and client C 18. Each client represents a particular computer application, such as a computer game, that is executing for instance on a general purpose personal computer. The clients each have access to some type of physical computer data storage, such as a disk storage medium, as is shown at 20, 22, and 24, upon which is stored application data. The term application data is used to generically refer to data that is specific to the particular distributed application. Thus, for a computer game application, the application data would include, for instance, data that reflects the current state of the game, such as identification of current player/participants and their respective locations, player positions within the game environment, player scores/standings, player characteristics, game environment characteristics, etc. Obviously, for the multi-participant game to properly function, such data that is reflective of the application state must be available to each of the clients participating in the application session. Thus, when any one client manipulates the data (i.e., effects a change to the game state), that change must be made known to all of the other clients so as to preserve the integrity and accuracy of the game application.

As will be described in further detail below, each client maintains its own copy of application data throughout the application session. Preferably, the data is stored in the client's storage medium, indicated in FIG. 1 at elements 20, 22 and 24. In the example shown in FIG. 1, each of the plurality of clients can communicate with one another via the network 12 in ways that are well known in the art. Thus, when a client changes its application data, i.e. effects some change to the game state, that change is communicated to the other clients in the application session by way of a state update packet sent to each client via the particular network facilities being used. This communication of application data changes will be discussed in further detail below.

In a preferred embodiment, a client has the option of either hosting a new game application, or joining an existing one (discussed in further detail below). When a client initiates a new game application session, that client is referred to as the "host" client—client A in the example illustrated in FIG. 1. It is the host client that is responsible for managing the environment under which the distribution of application data between the clients participating in the application session takes place. For example, the host client can assign the application session a name and password, and can set settings and operating criteria for the session, such as the maximum number of players permitted. In a preferred embodiment, the host client also coordinates and controls the admission of new clients into the application session. It is also the responsibility of the host to allocate unique identifiers to other clients admitted into the application session, and to allocate identifiers to any players and/or groups created by other clients (discussed in further detail below).

Figure 2A:
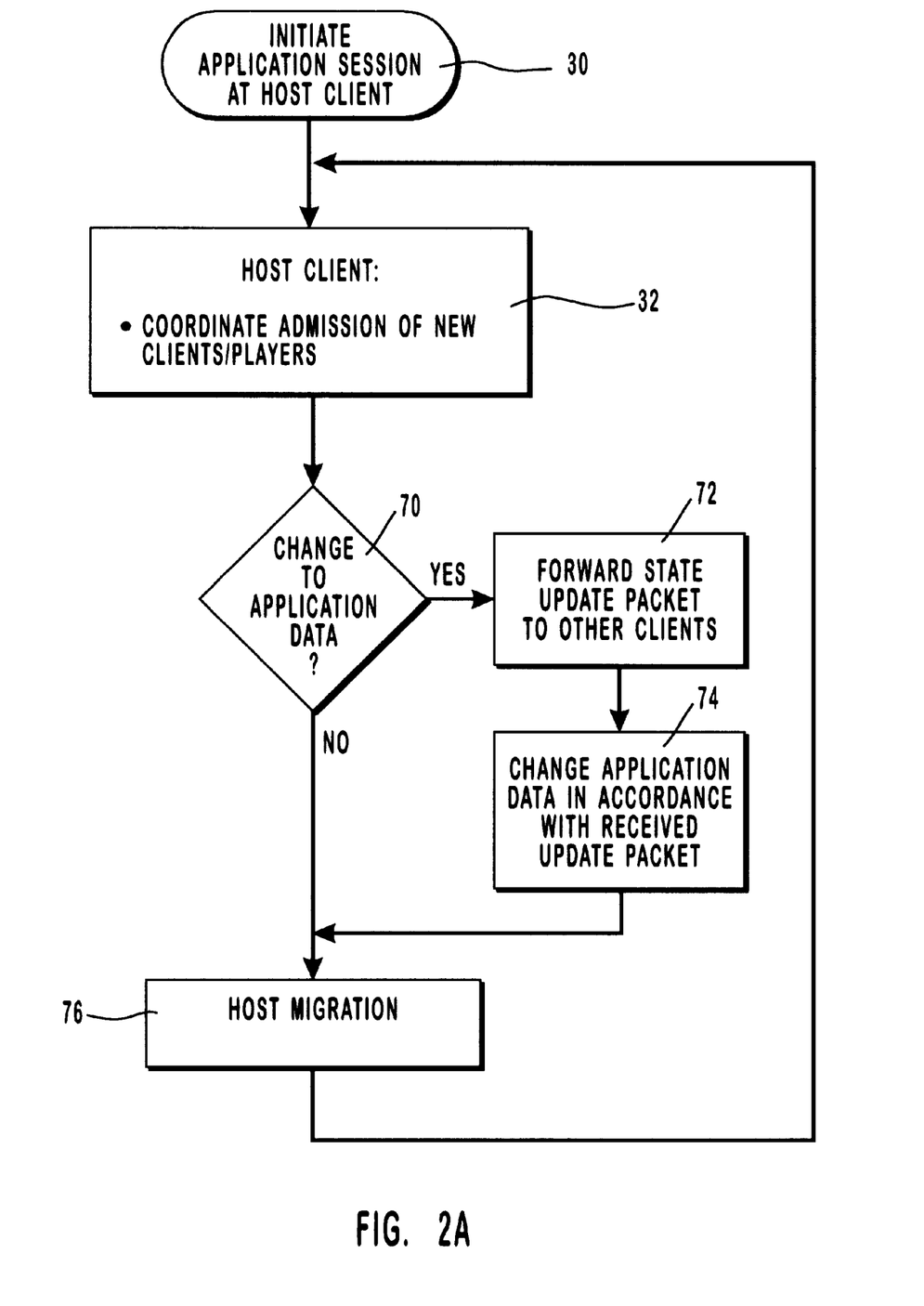
FIGS. 2A–2D illustrate a flow chart diagram illustrating the program steps for one embodiment of present invention.

Reference is next made to FIG. 2A, which is a flow chart illustrating one example of a preferred embodiment of the program flow for the current invention. Beginning at program step 30, the programmable CPU at the host client (14 in FIG. 1) executes the series of programmable instructions for initiating an application session for the particular computer game application. As noted above, the host client is the first client in the application session, and is the client that will be responsible for admitting new clients into the session. Moreover, as is shown in FIG. 1 the host client can, like any other client, create individual players, which can then be used to send messages to other players that are subsequently admitted into the application session. In the preferred embodiment, the host will typically assign a "name" for that particular session, and will then entertain requests from other clients on the network to be admitted into that application session. Other clients on the network 12 that are interested in participating in an application session may utilize available network protocols to seek out existing host clients. For instance, a network client may issue a network broadcast message requesting that any then existing host clients respond and identify themselves. That client can then select from the responses a particular host, and request admission to the application session.

Once the application session is initiated by the host client, the host client processor will proceed to program step 32, where the host client will monitor and coordinate the admission of network connected clients seeking to participate in the application session. The set of program steps corresponding to this function is shown in more detail in FIG. 2B, to which reference is now made.

Figure 2B:
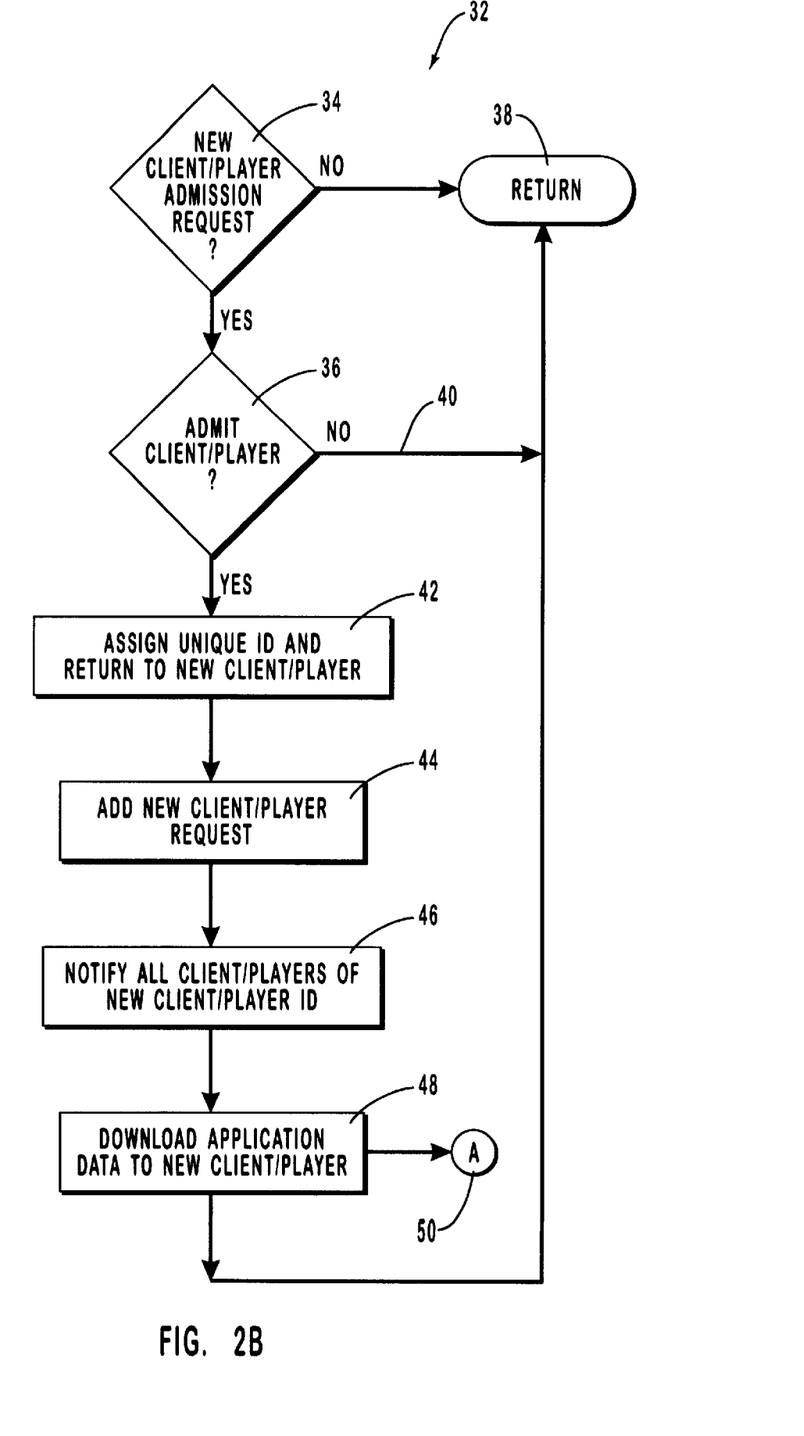

Beginning at decision step 34 in FIG. 2B, the host client processor monitors whether any network connected clients are requesting admission into the application session created by the host client. Preferably, the request would consist of a predefined data packet or message sent in accordance with the particular network 12 protocol. If there is no outstanding admission for request, the host client processor will return to the main portion of the program as is indicated at program step 38. If however, an admission request is detected at program step 34, the host client processor proceeds to program step 36. In a preferred embodiment, the host will admit the client into the application session depending on certain predefined criteria. For instance, the host client may assign a certain predetermined maximum number of players that may be admitted to the game application session, or a particular admission password may be required for entry. Other criteria may also be identified. At program step 36, the host client will determine whether the request should be granted depending on whether the particular admission criteria, if any, have been satisfied. If any applicable criteria are not met, the host client processor will deny access to the requesting client and return to the main section of program code, as is indicated schematically at line 40 and program step 38. If however the admission criteria are met, the host client will permit the client into the application session by performing the series of functional steps beginning at program step 42.

At program step 42 the host client assigns a unique identifier, referred to in the preferred embodiment as the "system player ID," to the client that is requesting admission into the application session. The system player ID is an identifier that uniquely identifies that particular client within the particular application session; each client within the session will have its own system player ID. While the identifier can take any one of a number of formats, in the preferred embodiment the player ID is comprised of a thirty-two bit data structure. This unique ID can include predetermined information that uniquely identifies the corresponding client within the application session and may include, for instance, an index into a network address table which identifies the clients unique network address. The system player ID can also include additional data that can be associated with that particular client, and in most instances the exact type and purpose of the data will be dictated by the particular game application that is being hosted.

Once the host client processor has assigned a unique identifier to the new client, it places the unique system player ID within a "name table" that is present at the host client's storage area (20 in FIG. 1). In the preferred embodiment, the name table is a predefined data structure that is part of the host client's application data, which contains the unique identifiers (system player IDs) for all of the clients that are currently participating in the application session.

Once the host client has forwarded the system player ID to the new client, the host client processor proceeds to program step 44. At that functional step the host client waits for the new client to acknowledge receipt of the system player ID. In a preferred embodiment, this acknowledgement is in the form of a data packet forwarded from the new client that requests that the client be added as an active client into the application session. Again, this request packet will be forwarded via a data packet in accordance with the particular network protocol being used.

Once the host client has received confirmation that the new client has received its system player ID and that it be added to the application session, the host client processor proceeds to program step 46. At this functional step, the host client processor initiates the program steps so as to notify each of the existing clients in the application session of the admission of the new client. Again, in the preferred embodiment the notification will be by way of a data packet sent in accordance with the particular network's protocol. As part of this notification step, the host client forwards the new client's unique system player ID to each of the existing clients. The other clients in the application session receive this notification along with the unique identifier of the new participant. Each receiving client then updates its own application data—namely the client's name table data structure which contains each of the system player IDs for each of the clients participating in the application session. Once the newly admitted client's ID is added, each of the existing application clients will proceed as if the new client is a member of the session.

Once the host client has notified all of the participants in the application session of the addition of the new client, the host client processor proceeds to program step 48 in FIG. 2B. At that functional step the host downloads, via the appropriate network facilities, the then current application data to the newly admitted client. In the preferred embodiment, the application data includes the name table data structure, including the system player IDs of the existing clients in the application session. The downloaded application data will also preferably include any application specific data that is relevant to the current state of the game. Again, the actual content and structure of the application data is arbitrary and its substance will be dictated by the particular game application involved. For instance, in an animated computer game environment, the data would likely include information relevant to the relative movements and positioning of players within the game, or any other type of similar information that would indicate the status of the game such as colors, participants, scores, animation changes and characteristics, etc.

It will be appreciated that the download of data called for in functional step 48 will often take some time depending, for instance, on the particular characteristics of the network, and the amount of data being downloaded. For instance, if the network being used to host the application session is a wide area network, such as in a public internet, network delays could cause the transfer of data between the host client and the new client to be a relatively long interval. During the download interval, since other clients in the session will continue to proceed with the game, changes to the game state will likely occur before the new client has received all of the application data. FIG. 2B illustrates how in one embodiment of the current invention measures are taken to insure that the new client is synchronized with the other clients once the application data is completely downloaded from the host. This function is indicated schematically at program step 50, which indicates that while the host client is downloading the application data, the new client monitors and keeps track of any changes to the state of the application session.

Figure 2C:
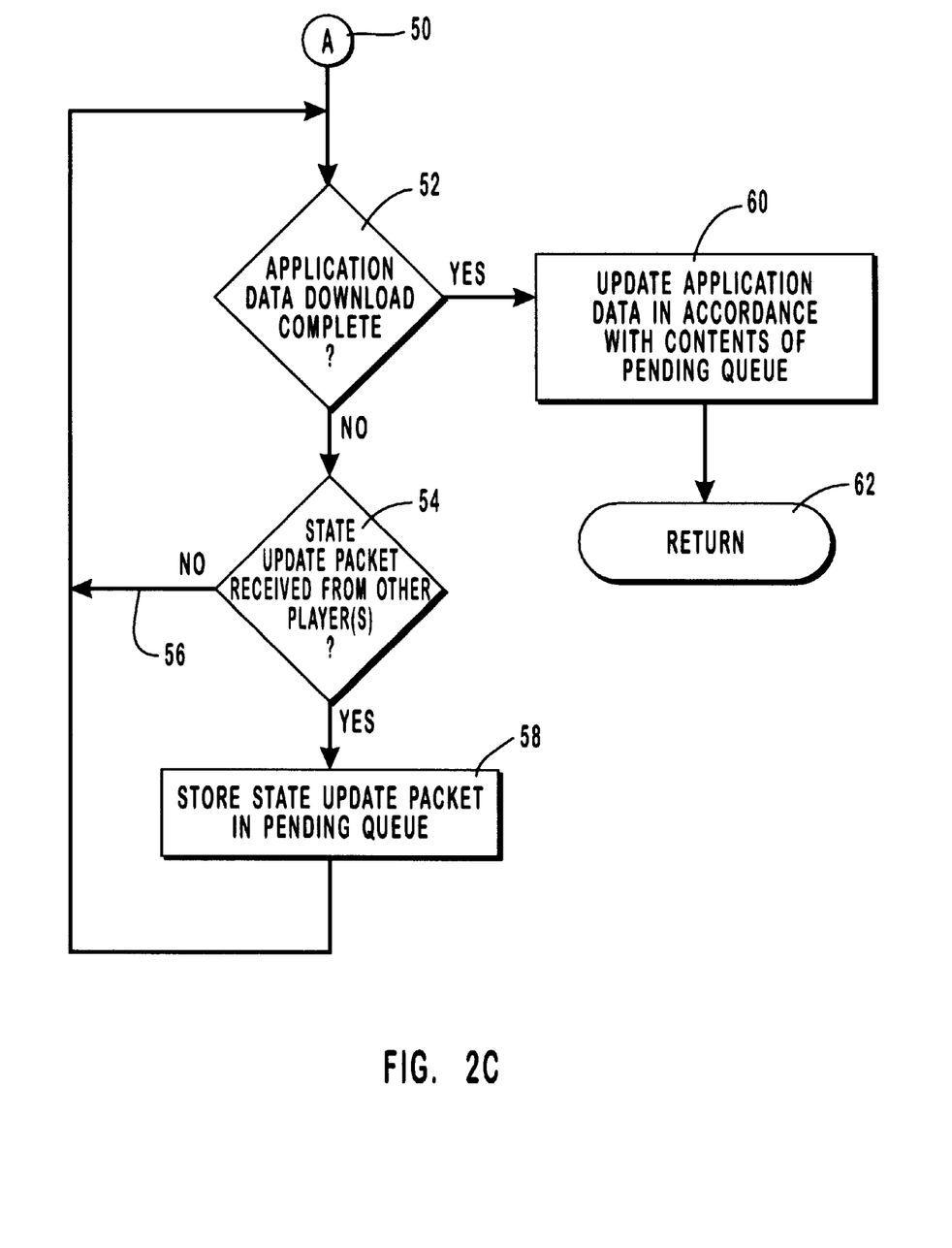

The synchronization process performed during the download of application data to the new client is illustrated in more detail in FIG. 2C, to which reference is now made. Beginning at functional step 52, the processor of the new client enters a loop where it monitors whether the application data being downloaded from the host client across the network is complete. If not yet complete, the client monitors the state of the application session to determine whether any state changes (i.e. changes to application data) have occurred during the application data download from the host client. This function is performed at program step 54, where the new client checks whether any state update packets have been forwarded from any of the other existing clients in the application session. A state update packet is generated by any client in the event that it takes any action that results in a change to the game state, thereby resulting in a change to that client's application data. The contents of the update packet reflect the particular application data change, and the packet is forwarded to each of the other clients in the application session so as to apprise them of changes to the game state. Since clients in the session are proceeding as if the new client is already an active member of the application session, any changes to application data would also result in a state update packet being sent to the new client as well.

If the new client does not detect the receipt of any status update packets being received from other clients, the client's processor continues in the loop as indicated schematically at line 56 and continues to monitor the download of the application data from the host client and the receipt of state update packets from other clients in the application session, as described above.

In the event that the new client does detect receipt of a state update packet from any other client in the application session, the new client processor proceeds to functional step 58 in the flow diagram of FIG. 2C. At that step, the processor stores the contents of the state update packet in a storage area referred to as the "pending queue." The pending queue is where the new client keeps all data reflecting changes to the game state occurring during the time interval that application data is being downloaded from the host client. The processor then continues in the loop to continue monitoring the completion of the download process and receipt of additional update packets.

When the new client does detect that the application data has been completely downloaded at program step 52, the new client proceeds to program step 60. At this point the application data may not be accurate if changes to the game state have been made during the download interval. Thus, at functional step 60, the new client processor updates the downloaded application data in accordance with the contents of the pending queue data, which contains any changes that have occurred during the download interval.

Optionally, the application data structure that is downloaded from the host to the new client can be data compressed at the host client and then uncompressed at the receiving client using algorithms that are well known in the art. Compression would reduce the transmission delay that may occur with large data downloads.

Once the application data at the new client is updated, the newly admitted client is synchronized with the rest of the clients in the session, and can then begin participating in the application session. As is shown at functional step 62, process flow then returns to the main portion of the program method in FIG. 2B. There, the host client continues to monitor and process any new player admission requests at program step 34. If there are no outstanding admission requests, the program flow returns to the main portion of the program method, as is indicated at program step 38.

Referring again to FIG. 2A, once the host client has admitted client(s) into the application session, each client will continuously monitor any changes to the state of the application session made by any of the other clients by way of messages, in the form of state update packets, forwarded between the clients in a peer-to-peer fashion. This functional exchange of state information between clients is illustrated in the loop beginning at program step 70 in FIG. 2A. Program step 70 illustrates how each client monitors whether it (or any of the players defined at the client) has made any change to the application state that affects the application data stored in connection with that client. If a client (or player) does change its own application data as a result of some application dependent action, then the client's processor will proceed to functional block 72 where it will build a state update packet. In the preferred embodiment, this packet contains data that represents the actual change made to the client's application data. The client, after having updating its own application data, reviews the contents of the client's name table so as to identify the other active participants in the session by way of the system player IDs. The client then forwards a state update packet to each of the other clients so as to apprise them of the change to the game application state.

As is indicated at functional block 74, each of the other clients in the application session will receive that state update packet via the network 12, and will then change its respective application data in accordance with the contents of the received packet. In this way, all clients in the application session are always operating on a common set of application data, even though the application data is distributed throughout the network and stored at each client location.

Preferably, the format of the state update packet is such that its size and content can vary, depending on the actual application being used and the information being transferred. Also, in one embodiment, the update packet will include software version information indicating the particular version of the software used to generate the message. If a network has clients running different versions of the software, then each client will be aware of the various versions participating in the session, and can format messages (e.g., state update packets) so as to be compatible with the various versions present. This permits different versions to be compatible and participate in the same application session. Also, in a preferred embodiment, the sizes, offsets, formats, etc. of each message forwarded between clients is contained within the message itself, and is not predefined. Thus, when receiving a message, clients will make no assumptions about the format or size or offsets of the message. Again, this approach insures compatibility between clients running different versions of the software.

Further, while the above embodiment has been described in the context of data being exchanged between individual clients only, in the embodiment illustrated in FIG. 1 it is shown how clients are able to define players and groups. By way of example, a player is an individual participant in the application session, typically representing a single user. A group is a logical collection of one or more players. In this embodiment, messages can be sent from player to player or from player to group. In addition, messages can be sent to the system group, which is defined as all the players in the session. A message sent to a group will result in an individual message being sent to each player within the group.

Like the unique system player ID that is generated for each client in a session, in a preferred embodiment the host client is also responsible for assigning unique identifiers for players and groups that are defined by clients. Again, this unique identifier, referred to as the "player ID", can be any form that uniquely identifier players, and is stored in the name table portion of the application data distributed to each client.

By way of example, in a preferred embodiment the player ID is a 32-bit field. The field includes a 16-bit index, which functions as a pointer into a table, which has the memory location of the application data associated with that particular player or group. Also included in the player ID is a 16-bit uniqueness field. In a preferred embodiment, the uniqueness field is incremented every time an index is reused, and is then used to ensure that clients in the session do not reuse player IDs. The 32-bit value that results from the combination of these fields is XOR'ed with a session key. The session key is passed down to each client with the name table portion of the application data. The session key is a random number which allows the host to generate non-predictable, non-repeating 32 bit player IDs for new players.

Messages can be exchanged between players by way of the unique player ID. However, in a preferred embodiment all messages are actually sent between application clients by way of the system player ID, and the receiving client then forwards the particular message to the local player or group.

Figure 2D:
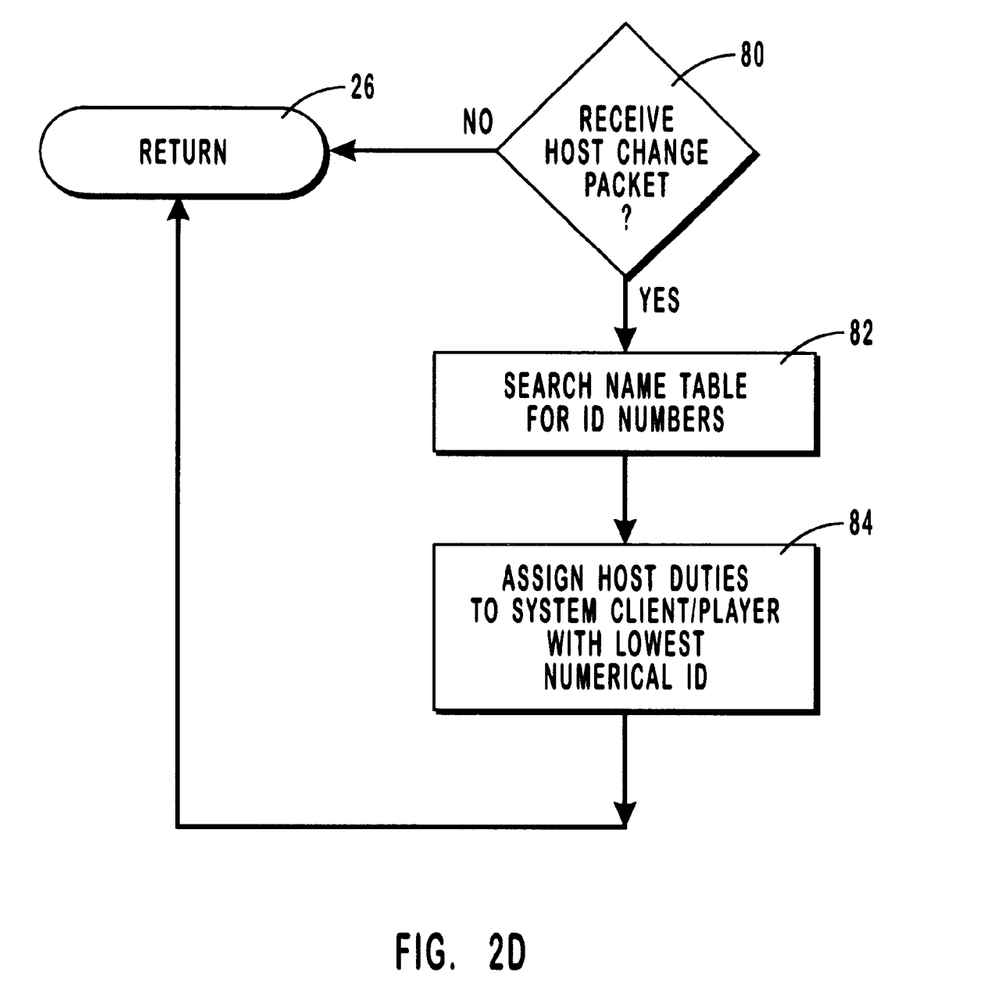

In addition to ensuring that each client is currently operating on the same set of application data, the preferred program method permits the host client to exit from the application session and transfer the host client duties over to one of the other clients in the session. This migration of host duties is accomplished in a manner that does not adversely affect the state of the application session. This particular function is represented generally at program method step 76 in FIG. 2A, entitled "Host Migration." An example of the preferred program steps corresponding to that particular function is shown in further detail in FIG. 2D to which reference is now made.

Beginning at functional step 80, each of the clients in the application session will monitor whether the host client has broadcast a host change notification packet. If none has been sent, the clients will continue processing as is indicated at functional step 26. If however a host change packet is detected, each client performs the program function shown at step 82. In the presently preferred embodiment, at this step each client searches through its own name table for all of the unique system player ID designations for each of the then existing clients in the session. Each client will then assign by default the host duties to that client which has a unique identifier that satisfies a certain predetermined parameter. In the preferred embodiment, the host duties are assigned to that client which has the lowest numeric unique identifier. Since the name table held by each of the client is identical, then each client will automatically agree as to the new host assignment, without having to undertake any complicated negotiation or decisional actions to assign new host duties. Once a host has been identified, the program method returns to the series of process steps illustrated in FIG. 2A, as is indicated at step 86 of FIG. 2D, and the new host will perform all of the host duties previously described.

Figure 3:
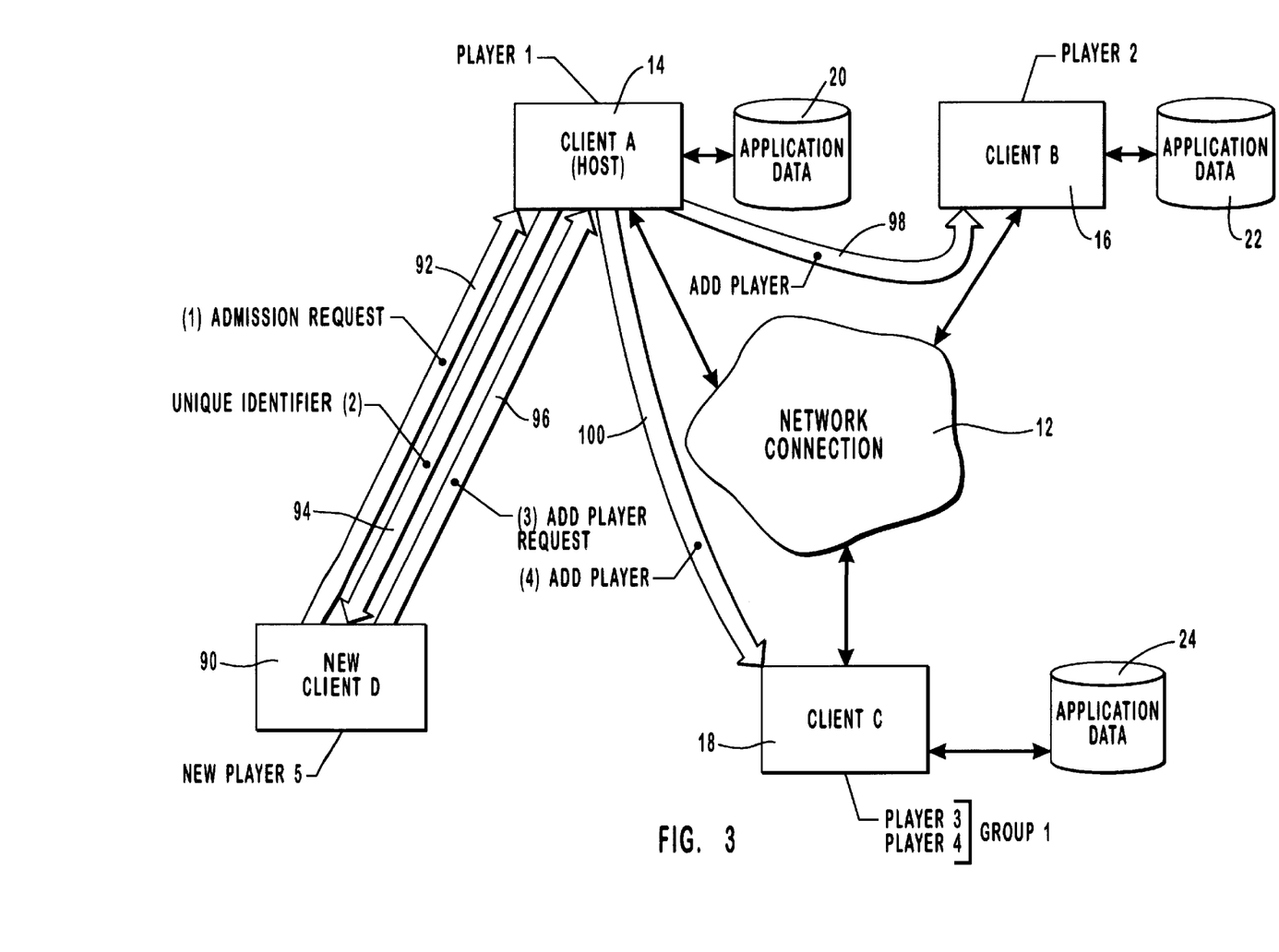
FIGS. 3 and 4 are system diagrams illustrating generally the process flow associated with the admission of a new client into the application session.
Figure 4:
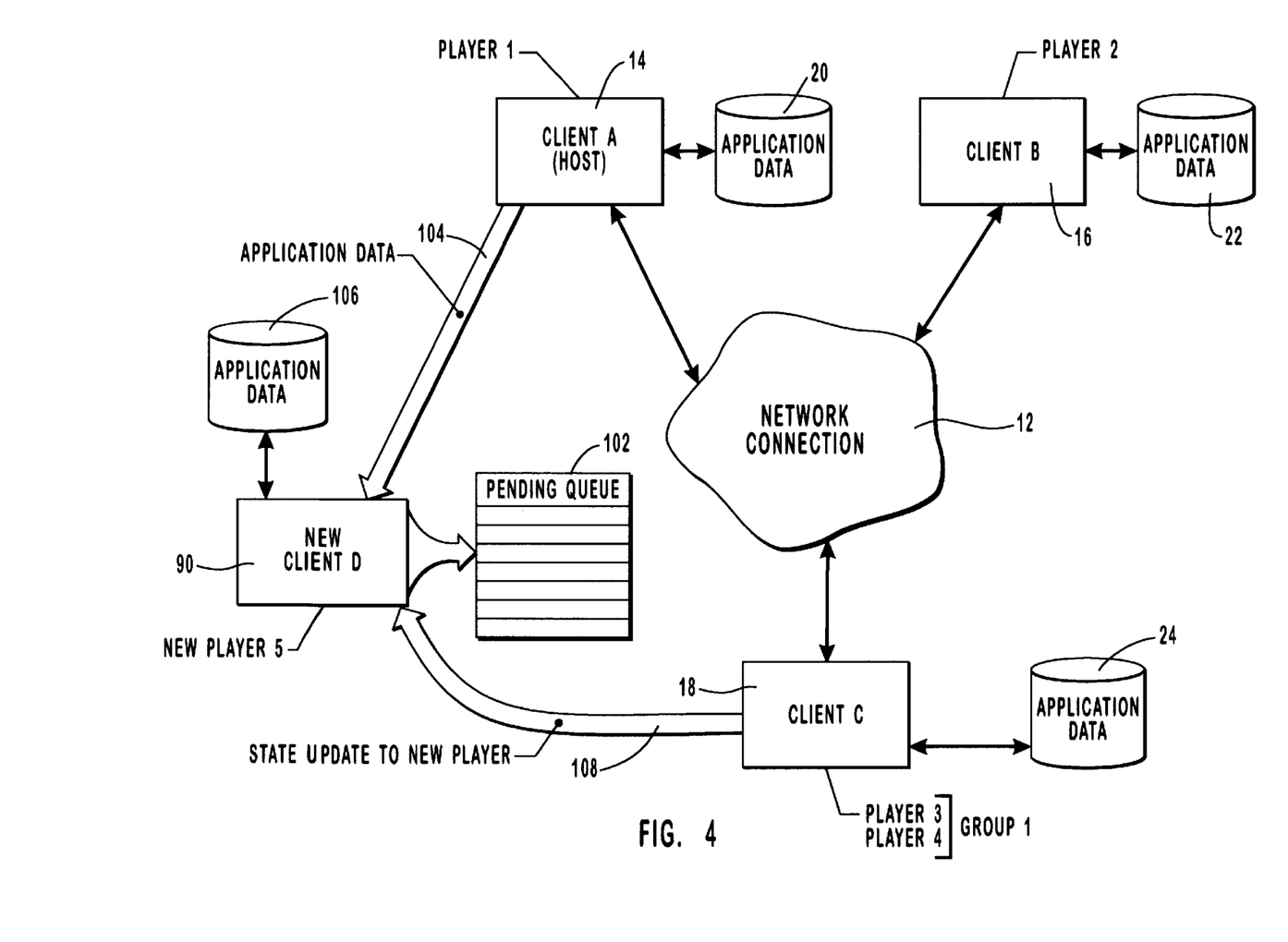
Figure 5:
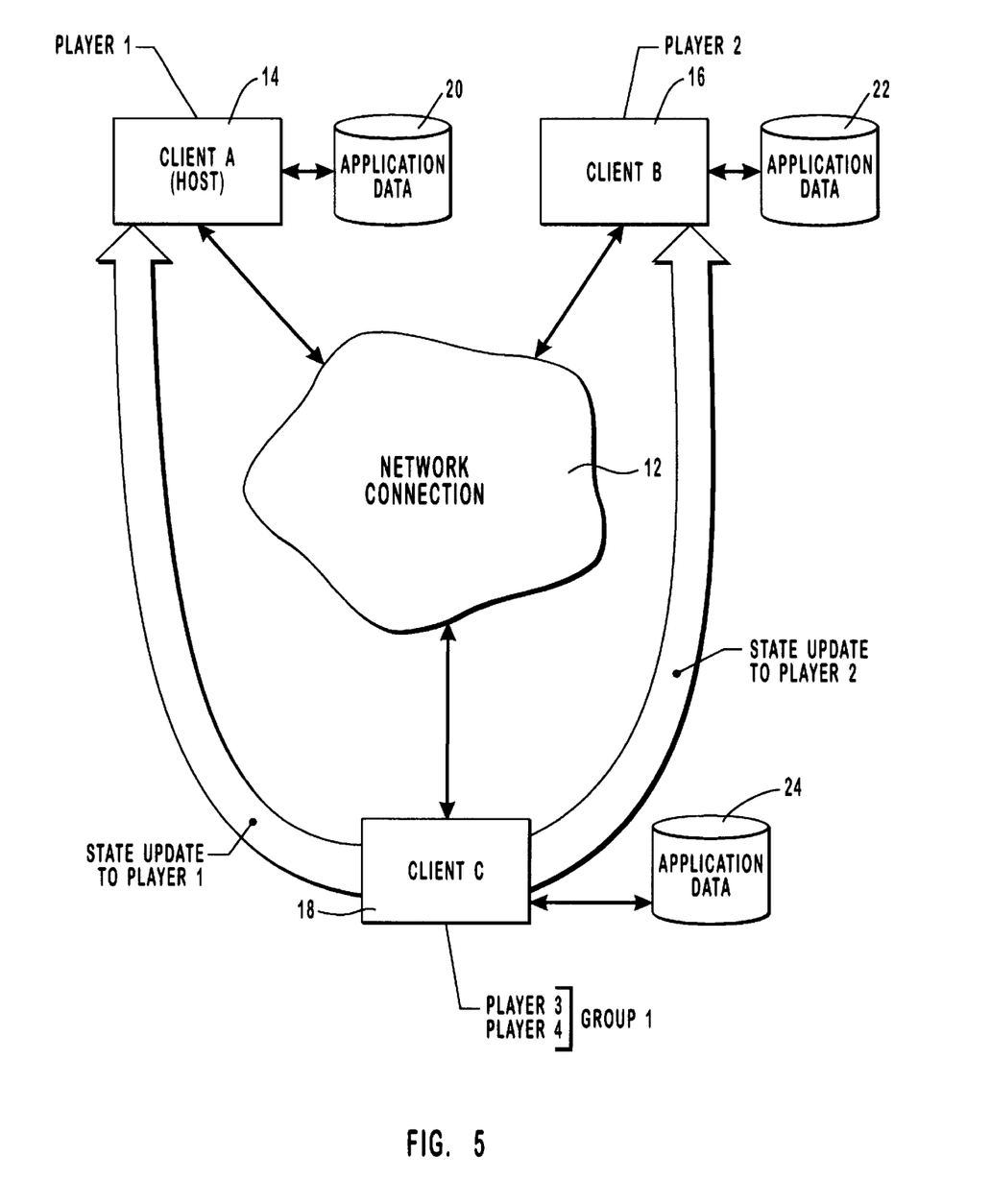
FIG. 5 is a diagram illustrating generally the process flow associated with the distribution and synchronization of state changes to other clients in an application session.

Reference is next made to FIGS. 3–5, which together illustrate some presently preferred examples of the functions described above in connection with the flow diagrams of FIG. 2. FIGS. 3 and 4 schematically illustrate an example of an overall system of the present invention, including the manner by which an outside network client is admitted into an existing application session. In this particular case, Client A is functioning as the host client. The clients already in the application session include, in addition to Client A, Client B and Client C. As is further shown, Client A has associated with it player No. 1, Client B has player No. 2 and Client C has defined players No. 3 and No. 4 which together comprise Group 1.

In this particular example, a new network connected client, referred to as Client D and shown at element 90, is seeking to become a participant in the application session. As is designated at flow arrow 92, the request is initiated by Client D by sending an "admission request" data packet via the network facilities provided by network 12 to the host client, Client A. If the host client A chooses to grant the admission request, based on predefined admission criteria, it returns a unique identifier (for example, the 32 bit system player ID described above) to Client D, as is designated via flow arrow 94. Once Client D has received its system player ID, it acknowledges the receipt by responding to the host client A by with an "add player request" packet, illustrated via flow diagram 96. The host client A then notifies each of the other clients currently in the application session, Client B and Client C, of the addition of the new player by way of "add player" packets, as is shown at flow arrows 98 and 100. As part of these add player packets, the host client A informs Clients B and C of the system player ID of the new client. The receiving Clients B and C then update their own respective name tables by adding new client D's identifier.

Referring next to FIG. 4, once each of the existing clients has been notified of the addition of the new client, they will proceed as if that new client is actually participating in the application session. As such, in the event that those clients manipulate their respective application data (i.e., make changes to the game state), they will assemble an appropriate state update packet and forward it to the other clients in the application session, including the newly added client. In the meantime, the host client A begins to download the current application data to the newly admitted client, Client D, as is illustrated via flow arrow 104 in FIG. 4. Since there may be some time delay from when the host client begins to download the application data and to when that download is actually complete, there may be changes to the game state that are made during the download. This circumstance is illustrated in FIG. 4, which shows Client C forwarding a state update packet to new client D while the host client A is still downloading application data to client D. To insure that it is not out of synch with the rest of the clients in the session once the download is complete, the contents of the state update packet are stored by Client D in the "pending queue," storage area, which is functionally designated at 102. Again, the pending queue is a memory storage area at Client D used to save all changes to the game state that occur during application data download. When the download of the application data from the host client is complete, Client D will store application data at its respective storage area, shown in FIG. 4 at 106, and then update the application data 106 in accordance with the contents of the pending queue. Once that update is completed, Client D possesses the same application state as each of the other clients in the application session.

FIG. 5 illustrates an example of an overall system of the present invention pertaining to the manner by which the application data that is stored at one client is kept the same as that of all of the other clients in the application session. Thus, for example, in the event that Player 3 at client C effects a change to the game state, it will change its own corresponding application data stored at location 24. Client C will simultaneously communicate that change via network 12, to each of the other clients/players in the application session using a peer-to-peer messaging scheme. The change is communicated via separate state update packets that are sent to the other clients/players in the session, as is designated by flow arrows to Client A and B. Addressing of the packets is accomplished by way of the unique identifiers contained within Client C's name table portion of its application data. As discussed above, the state update packet contains data that reflects the actual game state change that occurred at Client C, and is used by Client A and B to appropriately change their own respective application data. In this way, application data located throughout the application session will always be the same for each client, thereby insuring that each player is always operating against the same set of data.

In summary, the present invention is directed to a system and method that permits clients/players in a network distributed application session to operate on a shared set of common data. Because a central host client manages and coordinates the session, the application data is shared and synchronized between each of the clients, thereby insuring that each client/player is always operating against the same data as all of the other clients in the application session. Further, the single host arrangement also permits for the controlled entry of new clients and players in a manner the insures that the new participants are also provided with the same data as existing clients. Further, because the session application data is replicated and stored at each individual client, host client duties can easily be migrated to any existing client in the session.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a distributed processing system that includes a plurality of network connected application clients, a method for sharing application data between at least two of the application clients, the method comprising the following steps:
   (a) in a host client, initiating an application session and selectively admitting a new client into the application session, such that the application clients include the host client, the new client, and any other client participating in the application session;
   (b) transferring the application data from the host client to the new client, the application data comprising:
      (i) a data structure including a unique identifier for each of at least the host client and said any other client participating in the application session; and
      (ii) state data; and
   (c) in the event that any application client changes application data stored therein:
      (i) forwarding a state update packet from the application client changing the application data directly to all other application clients in the application session; and
      (ii) at each of the other application clients, receiving the state update packet and altering the application data stored at the receiving application client in accordance with the contents of the state update packet.

2. A method for sharing application data as defined in claim 1, further comprising the step of assigning host duties from the host client to another of the application clients, the step of assigning being conducted during the application session.

3. A method for sharing application data as defined in claim 2, further comprising the step of selecting said other of the application clients to which the host duties are assigned based on the unique identifiers contained in the application data at each application client.

4. A method for sharing application data as defined in claim 1, wherein the step of selectively admitting a new client into the application session comprises the following steps:
   (a) receiving, by the host client, an admission request from the new client; and
   (b) transmitting, by the host client, a unique identifier for the new client to each of said other clients participating in the application session.

5. A method for sharing application data as defined in claim 4, further comprising the step of selectively admitting the new client into the application session by the host client based on predetermined admission criteria.

6. A method for sharing application data as defined in claim 2, wherein the host duties include selectively admitting other new clients to the application session.

7. A method for sharing application data as defined in claim 4, further comprising the steps of:
   during the step of transferring the application data from the host client to the new client, compiling pending queue data at the new client, the pending queue data including data derived from at least one state update packet received by the new client from any other application client as the application data is transferred to the new application client; and
   updating the application data at the new client in accordance with the contents of the pending queue data.

8. A method for sharing application data as defined in claim 1, wherein the data structure further includes a unique identifier for the new client.

9. A method for sharing application data as defined in claim 1, wherein the application session enables a computer game to be executed at the application clients.

10. A method for sharing application data as defined in claim 9, wherein at least one of the application clients supports multiple clients.

11. In a network based distributed processing system that includes a single host client and at least one existing application client that are participating in a single application session and that are each operating on common application data, a method for admitting a new client into the application session such that the application clients of the application session include the host client, each of the at least one existing application client, and the new client, the method comprising the following steps:
   (a) receiving, by the host client, an admission request from the new client;
   (b) transmitting, by the host client, a unique identifier for the new client to each of the at least one existing application client;

(c) transmitting, by the host client, application data to the new client, the application data comprising:
  (i) a data structure including a unique identifier for each of at least the host client and the at least one existing application client; and
  (ii) state data;
(d) while the host client is transmitting the application data to the new client, compiling at the new client pending queue data, the pending queue data including data derived from at least one state update packet forwarded directly to the new client by any other application client in the application session; and
(e) updating the application data received at the new client in accordance with the contents of the pending queue data.

12. A method as defined in claim 11, further comprising the following steps:
in the event that any application client changes application data stored therein:
(a) forwarding a state update packet from the application client changing the application data to all other application clients in the application session; and
(b) at each of the other application clients, receiving the state update packet and altering the application data stored at the receiving application client in accordance with the contents of the state update packet.

13. A method as defined in claim 11, further comprising the step of assigning host duties from the host client to another of the application clients, the step of assigning being conducted during the application session, and said other of the application clients to which the host duties are assigned being selected from among the application clients based on predetermined characteristics of the unique identifiers contained in the application data at each application client.

14. A computer-readable medium for implementing, in a client computer, a method of enabling the client computer to become a new client admitted to an application session conducted in a distributed processing system, wherein application clients participating in the application session include a host client, at least one existing application client, and the new client, the computer-readable medium having computer-executable instructions comprising:
means for forwarding an admission request message to the host client that requests admission to the application session;
means for receiving from the host client a unique identifier assigned to the new client;
means for receiving from the host client application data used in the application session, the application data comprising:
  (i) a data structure including a unique identifier for each of at least the host client and the at least one existing application client; and
  (ii) state data;
means for compiling pending queue data, the pending queue data including data derived from at least one state update packet forwarded directly to the new client by any other application client in the application session while the new client is receiving the application data from the host client; and
means for updating the application data received at the new client in accordance with the contents of the pending queue data.

15. A computer-readable medium as defined in claim 14, further comprising computer-executable instructions comprising means for uncompressing application data received from the host client.

16. In a distributed processing system that includes a plurality of network connected clients, a method for hosting an application session between at least two of the network connected clients, the method comprising the following steps:
(a) in a host client selected from among the plurality of network connected clients, receiving a request from another of the plurality of network connected clients to be admitted into the application session;
(b) in the host client, selectively admitting the requesting client into the application session based upon predetermined admission criteria, such that application clients participating in the application session include the host client, the requesting client, and any other of the plurality of network connected clients participating in the application session;
(c) transferring application data from the host client to the requesting client, the application data comprising:
  (i) a data structure including a unique identifier for each of at least the host client and said any other of the plurality of network connected clients participating in the application session; and
  (ii) state data;
(d) in the event that any application client changes its application data:
  (i) forwarding a state update packet from the application client changing its application data directly to any other application client in the application session; and
  (ii) at each of the other application clients in the application session, receiving the state update packet and altering the application data stored at the receiving application client in accordance with the contents of the state update packet; and
(e) exiting the application by the host client and, as the application session continues, causing host duties to migrate from the host client to another one of the application clients based on predetermined selection criteria.

17. A method as defined in claim 16, wherein the step of selectively admitting the requesting client into the application session comprises the following steps:
(a) while the application data is being transferred to the requesting client, compiling at the requesting client pending queue data, the pending queue data including data derived from at least one state update packet forwarded to the requesting client by any other application client in the application session; and
(b) when the step of transferring application data is complete, updating the application data transferred to the requesting client from the host client in accordance with the contents of the pending queue data.

* * * * *

UNITED STATES PATENT AND TRADEMARK OFFICE
CERTIFICATE OF CORRECTION

PATENT NO. : 5,987,376
DATED : November 16, 1999
INVENTOR(S): Kipley J. Olsen, Andrew R. Cohen It is certified that error appears in the above-identified patent and that said Letters Patent are hereby corrected as shown below:

Col. 3, ln. 1: after "responible for" change "insuring" to --ensuring--

Col. 4, ln. 11: after "as to" change "insure" to --ensure--

Col. 4, ln. 56: after "of" and before "present" insert --the--

Col. 9, ln. 3: after "to" change "insure" to --ensure--

Col. 10, ln. 29: before "its own" change "updating" to --updated--

Col. 10, ln. 61: after "approach" change "insures" to --ensures--

Col. 11, ln. 13: after "uniquely" change "identifier" to --identifies--

Col. 11, ln. 62: after "of the" change "client" to --clients--

Col. 13, ln. 33: after "manner" change "the" to --that--

Col. 13, ln. 34: before "that the" change "insures" to --ensures--

Col. 13, ln. 42: after "only as" change "illustrated" to --illustrative--

Signed and Sealed this

Third Day of April, 2001

NICHOLAS P. GODICI

*Attesting Officer*    *Acting Director of the United States Patent and Trademark Office*